United States Patent [19]

Imataki

[11] Patent Number: 5,503,889
[45] Date of Patent: Apr. 2, 1996

[54] OPTICAL RECORDING MEDIUM AND PRODUCTION THEREOF

[75] Inventor: Hiroyuki Imataki, Yokohama, Japan

[73] Assignee: Canon Kabushiki Kaisha, Tokyo, Japan

[21] Appl. No.: 151,366

[22] Filed: Nov. 12, 1993

[30] Foreign Application Priority Data

Nov. 16, 1992 [JP] Japan ................... 4-329001

[51] Int. Cl.⁶ ............................. B32B 3/00
[52] U.S. Cl. ............... 428/64.1; 428/64.2; 428/64.4; 428/64.8; 428/65.1; 428/913; 430/270.14; 430/495.1; 430/945; 369/283; 369/288
[58] Field of Search ............... 428/64, 65, 913, 428/64.2, 64.4, 64.8, 65.1; 430/270, 495, 945; 346/76 L, 135.1; 369/283, 288

[56] References Cited

U.S. PATENT DOCUMENTS

| | | | |
|---|---|---|---|
| 4,432,002 | 2/1984 | Ando | 346/135.1 |
| 5,026,623 | 6/1991 | Imataki et al. | 430/270 |
| 5,079,127 | 1/1992 | Katagiri et al. | 430/269 |
| 5,102,709 | 4/1992 | Tachibana | 428/64 |
| 5,204,152 | 4/1993 | Yoshizawa | 428/64 |
| 5,204,153 | 4/1993 | Matsui | 428/64 |
| 5,316,814 | 5/1994 | Sawada | 428/64 |

FOREIGN PATENT DOCUMENTS

| | | |
|---|---|---|
| 0049813 | 4/1982 | European Pat. Off. |
| 0259151 | 3/1988 | European Pat. Off. |
| 59-151343 | 8/1984 | Japan |
| 1-21798 | 4/1989 | Japan |
| 3-140380 | 6/1991 | Japan |

Primary Examiner—Patrick J. Ryan
Assistant Examiner—Elizabeth Evans
Attorney, Agent, or Firm—Fitzpatrick, Cella, Harper & Scinto

[57] ABSTRACT

An optical recording medium has a substrate, a recording layer having a bare portion at the end face, and a protecting layer. The bare portion of the recording layer and the vicinity thereof are resinified so as to be substantially incapable of optical recording.

38 Claims, 6 Drawing Sheets

THICKNESS OF
RECORDING LAYER

OPTICAL RECORDING MEDIUM AND PRODUCTION THEREOF

BACKGROUND OF THE INVENTION

1. Field of the Invention

The present invention relates to an optical recording medium for recording and/or reproduction of information with light, particularly to a recording medium having excellent durability. The present invention also relates to a process for producing the optical recording medium.

2. Related Background Art

Various types of optical recording media have been commercialized and are now being studied and developed for use for optical information recording and/or reproduction apparatus such as compact disks, additional-writing type disks, and optical disks employing an erasable magnetooptical material or a phase transition type material. Lately, portable optical recording media such as a rectangular card-shaped optical recording medium (hereinafter referred to as an "optical card") in a size of 85 mm×54 mm are attracting attention.

A conventional optical recording medium, for example, has a construction as shown in FIG. 4 in which a recording layer 32 is formed on a substrate 31, and thereon an adhesion layer 33 is laminated, and further thereon a protection layer 34 is laminated with interposition of an adhesion layer 33. In such a construction, an end portion of the recording layer is bare and is exposed to the outside at the side end face of the optical recording medium as shown in FIG. 4. Therefore, the recording layer is liable to deteriorate owing to penetration of moisture or oxygen from the bare portion of the recording layer into the interior thereof, disadvantageously. Although the substrate 31 and the protecting layer 34 are bonded with interposition of the recording layer 32, the adhesion strength is not strong enough, and the recording layer is liable to be separated from the substrate. If separation occurs in this portion, the surface also of the recording layer becomes bare and the deterioration of the recording layer will be accelerated.

To offset such disadvantages, U.S. Pat. No. 4,432,002 discloses an optical recording medium in which the recording layer 32 is sealed by the adhesion layer 33 without bareness of the recording layer at the side end face of the recording medium as shown in FIG. 5 to stabilize the recording layer. In such a recording medium, the adhesion layer itself is required to have little effect on the recording layer for protecting the recording layer against the external environment and giving satisfactory adhesion.

In the case of personally carried optical recording media such as an optical card, it should be taken into account that the optical card is kept under severe conditions than optical disks for use for filing systems in offices. For example, the tentative standard for optical cards laid down by Japan Business Machine Makers Association proposes to impart chemical resistance to an optical recording medium such that the function of the optical recording medium is not affected by a variety of chemicals (e.g., acetic acid, etc.). However, a satisfactory adhesive has not been found which has little affect on the recording medium, while having sufficient chemical resistance, and exhibiting a high level of adhesion performance.

In the construction as shown in FIG. 5, the recording layer needs to be formed in a pattern on the substrate in order that the recording layer is not bare at the end face.

The process of forming a recording layer of an optical recording medium is selected depending on the material used for the recording medium. For example, vacuum film-forming methods including vapor deposition and sputtering are employed in the case where the recording medium is formed from an inorganic material such as a metal, e.g., like aluminum, and an amorphous film of a carcogenide, e.g., bismuth, tellurium oxide, etc. In the case where the recording layer is formed from organic pigment, wet coating methods of application of a solution or a dispersion of an organic pigment in water or a solvent are employed since such methods enable formation of the recording layer at a low cost at high productivity. In any method, formation of the recording layer in a pattern involves problems in improving productivity.

When the patterned recording layer is formed by a vacuum film-forming method, a mask for covering the portion other than the recording layer region has to be placed in a precise position. When the patterned recording layer is formed by a wet coating method, a technique is required for pattern printing by use of a screen plate or a gravure plate. When a preformat such as track grooves and prepits is formed on a substrate for information recording, the position of the recording layer formation has to be registered precisely relative to the preformat.

The wet coating method of film formation inevitably gives thickness change at an end portion of the recording layer (hereinafter this portion is referred to as a "non-uniform thickness region" of a recording layer) as shown in FIG. 6 owing to a transition phenomenon. Furthermore, the reflectivity of the recording layer composed of an organic pigment varies remarkably at a thin region as shown in FIG. 7. Therefore, the end portion of the recording layer cannot be used practically as a region 63 for recording and reproduction of information (hereinafter referred to as a "recording-reproduction region") to record and/or reproduce information stably. The uselessness of the recording layer end region as the recording-reproduction region will further decrease disadvantageously the recording capacity of the optical recording layer in addition to the decrease caused by the formation of a margin region 62 at the end portion for preventing the recording layer from bareness.

This problem is of great technical importance for optical recording mediums like optical cards which are carried by individual persons and limited in external shape and size.

The present invention was made to solve the above problems.

SUMMARY OF THE INVENTION

An object of the present invention is to provide an optical recording medium which has excellent stability of the recording layer and exhibits high reliability.

Another object of the present invention is to provide an optical recording medium having a recording layer formed by wet coating, which has excellent environmental stability and has less decreased recording capacity.

A further object of the present invention is to provide a process for producing an optical recording medium which has excellent stability of the recording layer and exhibits high reliability.

A still further object of the present invention is to provide a process for producing an optical recording medium having excellent environmental stability at low cost without patterning of a recording layer.

After comprehensive investigation to solve the above problems, the inventors of the present invention found that the recording layer can be resinified without loss of recording ability by impregnating an uncured polymerizable liquid component into the recording layer containing organic pigment and subsequently curing the component, and that the resinified recording layer has excellent stability not only against moisture and oxygen but also against various chemicals, and the layer exhibits sufficient adhesiveness to a resin substrate equal to or higher than the adhesiveness between resin materials with an ordinary adhesive, and completed the present invention.

The present invention provides an optical recording medium having a substrate, a recording layer having a bare portion at the end face, and a protecting layer, the bare portion of the recording layer and the vicinity thereof being resinified so as to be substantially incapable of optical recording.

The present invention further provides an optical recording medium having a substrate, a recording layer, and a protecting layer, the end portion and the vicinity thereof of the recording layer being resinified so as to be substantially incapable of optical recording.

The present invention further provides an optical recording medium having a substrate, a recording layer containing an organic pigment, and a protecting layer, the end portion and the vicinity thereof of the recording layer being resinified so as to be substantially incapable of optical recording.

The present invention still further provides a process for producing an optical recording medium having a substrate, a recording layer having an uncovered portion at the end face, and a protecting layer, the process comprising steps of forming a recording layer on the substrate having an end portion, resinifying a portion of the recording layer formed at the end portion and vicinity thereof of the substrate so as to be substantially incapable of optical recording, and forming a protecting layer on the recording layer with interposition of an adhesion layer.

The present invention still further provides a process for producing an optical recording medium having a substrate, a recording layer, and a protecting layer, comprising steps of forming a recording layer on the substrate, resinifying the end portion and the vicinity thereof of the recording layer so as to be substantially incapable of optical recording, and forming a protecting layer on the recording layer with interposition of an adhesion layer.

DETAILED DESCRIPTION OF THE PREFERRED EMBODIMENTS

The present invention is described in detail by reference to drawings.

Figure 1A:
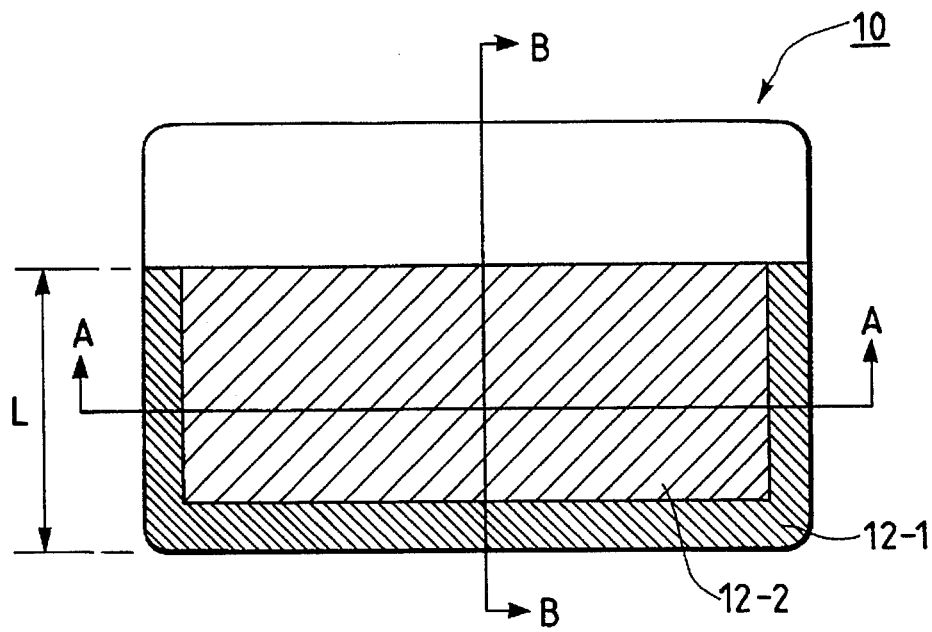
FIG. 1A is a schematic plan view of an optical card according to the present invention.
Figure 1B:
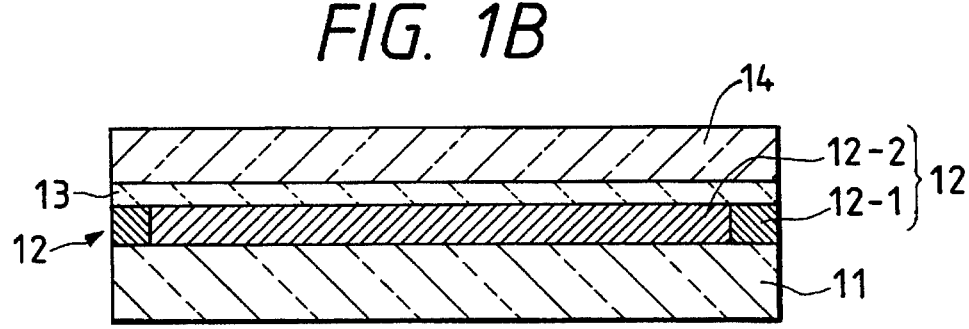
FIG. 1B is a sectional view of the optical card at the line A—A in FIG. 1A.
Figure 1C:
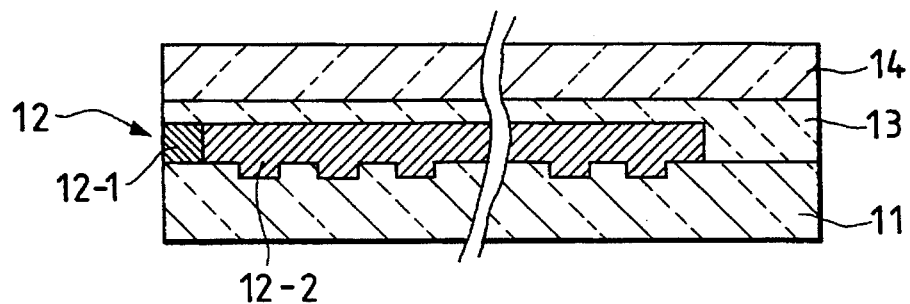
FIG. 1C is a sectional view of the optical card at the line B—B in FIG. 1A.

FIG. 1A is a schematic plan view of an optical card 10 according to the present invention. FIG. 1B is a sectional view of the optical card of FIG. 1A at the line A—A in the length direction in FIG. 1A. FIG. 1C is a sectional view of the optical card of FIG. 1A at the line B—B in the width direction in FIG. 1A.

Figure 2A:
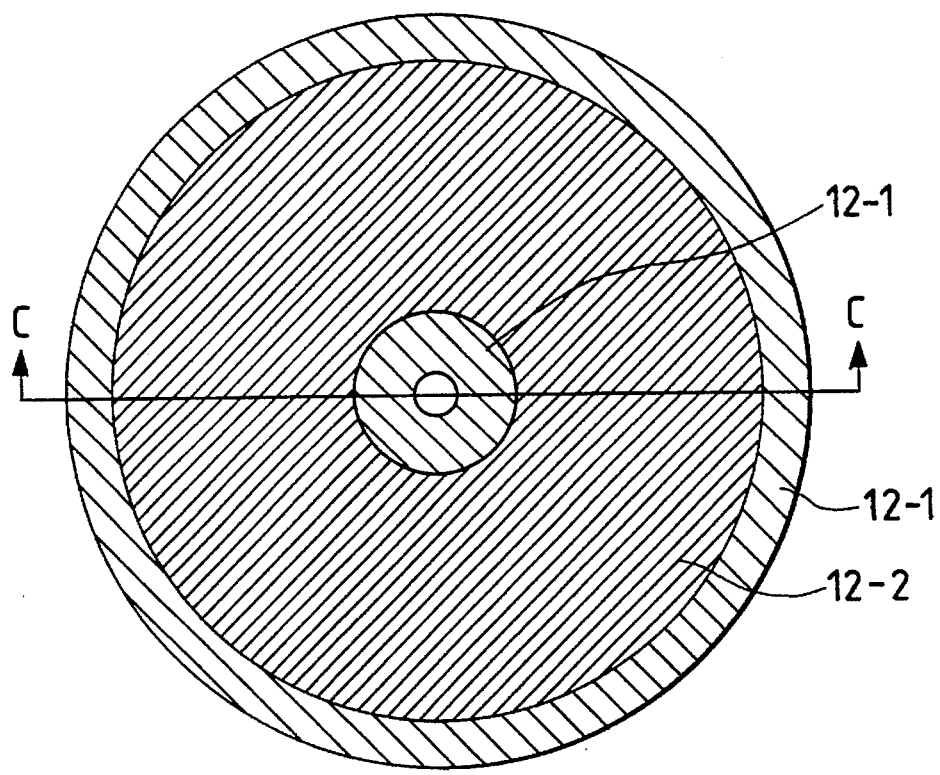
FIG. 2A is a schematic plan view of an optical disk according to the present invention.
Figure 2B:
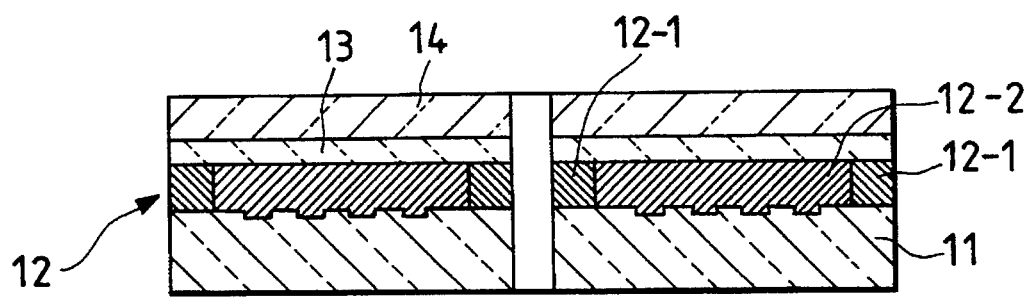
FIG. 2B is a schematic sectional view of the optical disk at the line C—C in FIG. 2A.
Figure 3:
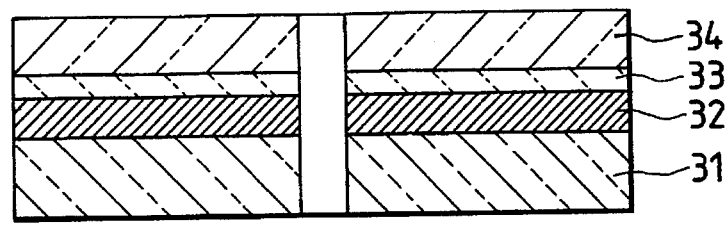
FIG. 3 is a schematic sectional view of a conventional optical disk.

FIG. 2A is a schematic plan view of an optical disk according to the present invention. FIG. 2B is a sectional view of the optical disk along the diameter direction in FIG. 2A.

In FIGS. 1A, 1B, and 1C, and FIGS. 2A and 2B, a resin substrate 11 has track grooves in stripes on the surface thereof, and a recording layer 12 is formed on the substrate surface including the end portion of the substrate. An adhesion layer 13 and a protecting layer 14 are formed thereon.

Figure 4:
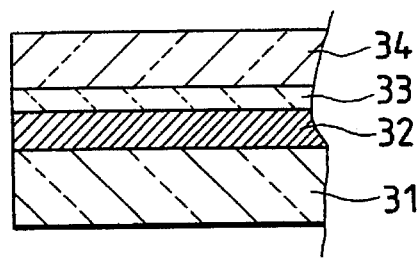
FIG. 4 is an enlarged sectional view of an end face portion of a conventional optical recording medium.

The recording layer at the region 12-1 including the end portion of the upper face of the substrate and the vicinity thereof is resinified in the present invention. The resinified recording layer has extremely high chemical resistance, serving to protect effectively the recording layer in the recording-reproduction region 12-2 inside the resinified recording layer, and simultaneously improving the adhesion of the recording layer to the substrate remarkably. With such a construction, an optical recording medium can be produced, which has performance equal to or superior to the one having a recording layer sealed with an adhesive as shown in FIG. 4, without lowering productivity and without forming recording layer in a pattern.

The resinified recording layer in the present invention is provided by impregnating an uncured polymerizable liquid component (e.g., a liquid photo-polymerizable monomer or prepolymer, or a liquid composition comprising a thermally polymerizable monomer or prepolymer and a polymerization initiator) into the recording layer and then polymerizing the polymerizable component, or otherwise impregnating a liquid resin (a solution of a polymer in a solvent or a molten polymer in a liquid state) into the recording layer and then evaporating the solvent or cooling the molten polymer to solidify the polymer. The resinified recording layer has a construction that the resin component has penetrated into the interstices among the molecules of the recording material in the recording layer.

The recording layer in the present invention is preferably resinified in such a degree that the resinified portion is not capable substantially of optical recording when information is recorded under the conditions shown below onto the recording-reproduction region 12-1 of the recording layer of an optical recording medium, and has sufficient chemical resistance with sufficient adherence to the substrate.

Wavelength: 830 nm

Spot diameter: 3.0 μm(1/e$^2$)

Laser output: 4–6 mW

Pulse width: 50 μsec

Relative velocity of laser light to optical recording medium: 60 mm/sec

The reason is not clear why the protection ability of the resinified recording layer is improved by resinification to such a degree that it is incapable of optical recording. It is presumed that microscopically, an organic pigment-containing recording layer deteriorates chemically by penetration and diffusion of a chemically active substance into interstices among the pigment molecules or in the crystalline structure to attack the pigment molecules. When a portion of the recording layer is resinified to be incapable substantially of optical recording, presumably the aforementioned interstices are filled with the resin to prevent effectively the penetration and diffusion of the chemically active substance into the recording layer, thereby the protection function being improved.

The term "incapable substantially of optical recording" means that when recording is conducted at the end region 12-1 of the recording layer, no information-recorded portion is observed by microscope, or information reproduced therefrom under the conditions below is not at a usable level as a signal (e.g., C/N ratio of less than 40 dB).

Wavelength: 830 nm

Spot diameter: 3.0 μm

Laser light output: 0.7 mW

Relative velocity of laser light to optical recording medium: 60 mm/sec

The method of resinifying the recording medium in the present invention includes, as described before, methods in which a liquid composition containing an uncured liquid polymerizable component such as a monomer and/or an oligomer, or prepolymer, and polymerization initiator or a crosslinking agent is applied onto the recording layer to impregnate the composition into the recording layer, and then polymerization or crosslinking is allowed to proceed; and methods in which a resin in a liquid form, e.g., a polymer solution in a solvent, or a molten polymer in a liquid state is applied onto the recording layer to impregnate the polymer into the recording layer, and then the solvent is evaporated or the polymer is cooled to be solidified.

The material to be impregnated into the recording layer includes specifically, in the case of organic pigment-containing layer, photocurable acrylate type compositions containing at least one compound selected for urethane acrylates, epoxy acrylates, polyester acrylates and polyol polyacrylates, and a polymerization initiator. More specifically the material to be impregnated in the present invention is preferably a photocurable composition containing an acrylate compound of three or more functionality owing to the ease of impregnation, feasibility of more complete resinification, and chemical resistance of the resulting resinified protecting layer.

The acrylate compound of three or more functionality includes trimethylolpropane triacrylate, trimethylolpropane trimethacrylate, pentaerythritol triacrylate, pentaerythritol trimethacrylate, 1,3,5-tris(β-acryloyloxyethyl)isocyanurate, 1,3,5-tris(β-methacryloyloxyethyl)isocyanurate, pentaerythritol tetracrylate, pentaerythritol tetramethacrylate, dipentaerythritol pentacrylate, dipentaerythritol hexaacrylate, dipentaerythritol hexamethacrylate, dipentaerythritol hexa(ω-acryloyloxy-ε-caproate), dipentaerythritol hexa(ω-methacryloyloxy-ε-caproate), and the like. These compound may used alone or in combination of two or more thereof. The acrylate compound of three or more functionality may be used in combination of an acrylate compound of two or less functionality, or, in order to impart flexibility to the resinified protection layer, the acrylate compound may be combinedly used with a urethane acrylate compound.

The urethane acrylate compound useful in the present invention can be prepared, for example, by reacting a carbonate-diol (average molecular weight: 500 to 5000) with ε-caprolactone to form an addition condensation product, reacting it with an organic polyisocyanate to form a urethane, and then reacting the urethane with a hydroxyacrylate compound to form an acrylate.

The photopolymerization initiator is not specially limited provided that it is capable of generating radicals on irradiation of light. In the case where the recording layer comprises an organic pigment, the initiator is preferably selected to have a radical generation wavelength outside the main light absorption region of the pigment in order to reduce the influence thereof on the region 12-2 on the recording layer in the resinification. For example, if recording is practiced with infrared laser beam of wavelength of 780 nm or 830 nm, the initiator is preferably selected from those which generate radicals by irradiation of ultraviolet light. Such initiators include acetophenones such as p-tert-butyltrichloroacetophenone, 2,2'-diethoxyacetophenone, and 2-hydroxy-2-methyl-1-phenylpropane-1-one; ketones such as benzopheneone, Michler's ketone, 2-chlorothioxanthone, and 2-isopropylthioxanthone; benzoin ethers such as benzoin, and benzoin isopropyl ether; benzyl ketals such as benzyl ketal, benzyl dimethyl ketal, and hydroxycyclohexyl phenyl ketal; and the like.

The photopolymerization initiator may be used alone or in a combination of two or more thereof. The photopolymerization initiator is used preferably in an amount of from 0.1 to 10% by weight, more preferably from 1 to 5% by weight.

The polymerizable component in the present invention may contain, in addition to an acrylate compound and an initiator as mentioned above, a further additive such as a silane coupling agent, a polymerization inhibitor, a leveling agent, and the like in order to control viscosity and to improve the properties within the range that the inherent property of the recording layer is not impaired.

The method of impregnation of the aforementioned material into the recording layer in the present invention is selected depending on the construction material and the film forming method of the recording layer, and the kind of the component to be impregnated. For example, in order to impregnate smoothly an uncured liquid polymerizable component into the recording layer, and yet to prevent penetration of the polymerizable component into the recording-reproduction region 12-2 adjacent to the resinified region 12-1, the viscosity of the composition is adjusted on application within the range of from 1 to 1000 cp, more preferably from 1 to 300 cp, still more preferably from 1 to 30 cp.

The viscosity in the present invention is measured according to JIS K7117 (1987) by use of a DB-type viscometer at 25° C.

The recording layer 12 in the present invention is preferably constituted so as to be resinified readily. Such a recording layer is suitably prepared by use of an organic pigment as the optical recording material by forming it into a film by wet application or vacuum film-formation e.g., vapor deposition and sputtering. In particular, a recording layer is preferred which is formed from an organic pigment by a wet application method.

The recording layer made from an organic pigment can be readily impregnated with an uncured liquid polymerizable component or a liquid resin and can be readily be resinified. When the recording layer is formed by wet application and the recording layer is sealed by an adhesive as shown in FIG. 4, the recording capacity is low as described before. With such a constitution, even when the recording layer is formed to the end side of the substrate, the environmental stability is achieved by resinifying the recording layer at the end portion and the vicinity thereof of the substrate, according to the present invention, with the same level of environmental stability as the optical recording medium illustrated in FIG. 5 or a higher level. Thereby a margin region 62 as shown in FIG. 6 is not required, and the recording capacity can be enlarged without impairing reliability of the optical recording medium.

The organic pigment for the recording layer is suitably selected from generally known pigments for optical recording in consideration of the wavelength of recording light beam and reproducing light beam, and absorption properties and reflection properties of the organic pigment. The organic pigment includes cyanine pigments, merrocyanine pigments, croconium pigments, squarium pigments, azulenium pigments, polymethylene pigments, naphthoquinone pigments, pyrrylium pigments, phthalocyanine pigments, naphthalocyanine pigments, and naphtholactam pigment. When the recording layer is formed by wet application, an organic pigment is preferably selected which has high solubility in solvent.

Specific examples of the pigments are polymethine pigments represented by the general formula (I) below disclosed in U.S. Pat. No. 5,079,127, and cyanine pigments represented by the general formula (II) below disclosed in Japanese Patent Publication No. 1-21798:

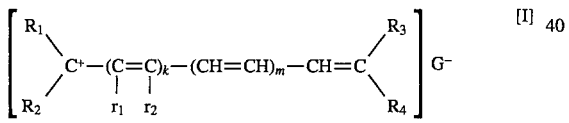

wherein $R_1$, $R_2$, $R_3$, and $R_4$ are independently a hydrogen atom, a substituted or unsubstituted alkyl group, a substituted or unsubstituted alkenyl group, a substituted or unsubstituted aralkyl group, a substituted or unsubstituted aryl group, a substituted or unsubstituted styryl group, or substituted or unsubstituted heterocyclic group; $r_1$ and $r_2$ are independently a hydrogen atom, a substituted or unsubstituted alkyl group, a substituted or unsubstituted cycloalkyl group, a substituted or unsubstituted alkenyl group, a substituted or unsubstituted aralkyl group, or a substituted or unsubstituted aryl group; k is 0 or 1, m is 0, 1, or 2; and $G^-$ is an anion residue;

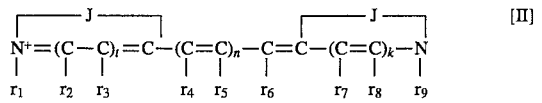

wherein J is a non-metallic atomic group for completing a nitrogen containing heterocyclic ring; $r_3$ to $r_9$ are the same as $r_1$ and $r_2$; t is 0 or 1; k is 0 or 1; n is 0, 1 or 2; and $G^-$ is an anion residue.

The recording layer may contain an aminium salt or a diimonium salt as a light stabilizer in addition to the above organic pigment.

The thickness of the organic pigment-containing recording layer is selected generally so as to allow reproduction of the information recorded on the recording layer depending on the material for the recording layer and the method of recording and reproduction. For example, in an optical recording medium on which information is recorded by formation of hollowed portions (or pits) and is reproduced by utilizing diffraction of light at the pits, the thickness of the recording layer is selected to obtain a maximum value of reflectivity at the surface of the recording layer, which is a function of the optical properties (refractive index: n, extinction coefficient: K) of the recording layer.

The organic pigment-containing recording layer in the present invention may be formed by a usual wet application method such as roll coating, dipping, spray coating, spin coating, and so forth, since the recording layer need not be formed in a pattern.

The recording layer in the present invention may be made porous to promote impregnation of an uncured liquid polymerizable component or a liquid resin and to facilitate resinification of the recording medium.

To make the recording layer porous, methods are useful, for example, which are described in U.S. Pat. No. 5,026,623 applied for by the inventors of the present invention. Specifically, the methods include:

(1) Film formation by casting under action of a swelling agent;

(2) Film formation under action of a blowing agent such as azodicarbonamide, and dinitropentamethylenetetramine;

(3) Film formation by use of two or more resins or copolymers composed of two or more components as a dispersant, and subsequent dissolution of one or more of the components of the dispersant; the useful copolymer including PVA-acrylonitrile type graft copolymers, PVA-acryl type graft copolymers, ethyl acrylate-methyl methacrylate copolymers, and the like;

(4) Film formation by use, for example, of a zinc chloride double salt with p-diethylaminobenzene chloride or p-dimethylaminobenzenediazonium chloride as a binder, and subsequent light irradiation.

(5) Porous formation by controlling the evaporation rate of the solvent at casting with a solvent.

The interstices in the recording layer thus prepared may be of an open cell structure or a closed cell structure. The porosity of the recording layer is preferably in the range of from 30 to 80%, more preferably from 40 to 70% to improve more the chemical resistance of the resinified protecting layer and to strengthen the adherence of the resinified protecting layer to the substrate.

The substrate 11 of the optical recording medium of the present invention may be made from a resin, glass, or ceramics which are known for a substrate material for optical recording mediums. Among them, a resin substrate is preferred to obtain sufficient adhesion between the resinified protecting layer and the substrate. The preferred resin for the substrate includes acrylic resins, polycarbonate resins, polystyrene resins, and polyolefin resins. The substrate may be either transparent or opaque to a light beam for recording and/or reproduction. When a light beam for recording or reproduction is introduced into the recording layer through the substrate, the substrate is required to be transparent to the light beam.

The thickness of the substrate is preferably to be sufficient to support the optical recording medium. When a light beam for recording or reproduction is introduced through the substrate, the thickness is preferably such that dust adhering on the substrate surface does not adversely affect the recording and reproduction of information. Therefor, the thickness is preferably in the range of 0.3 to 5 mm, more preferably from 0.8 to 1.5 mm.

A preformat may be formed on the substrate if necessary. The preformat in the present invention includes track grooves in a shape of a spiral, concentric circles, or stripes of about 0.5 to 5 µm in width, about 1 to 15 µm in pitch, and about 200 to 5000 Å in depth, and includes specifically encoded information in an optically readable shape, such as protrusions or hollows formed on the substrate surface.

Figure 8:
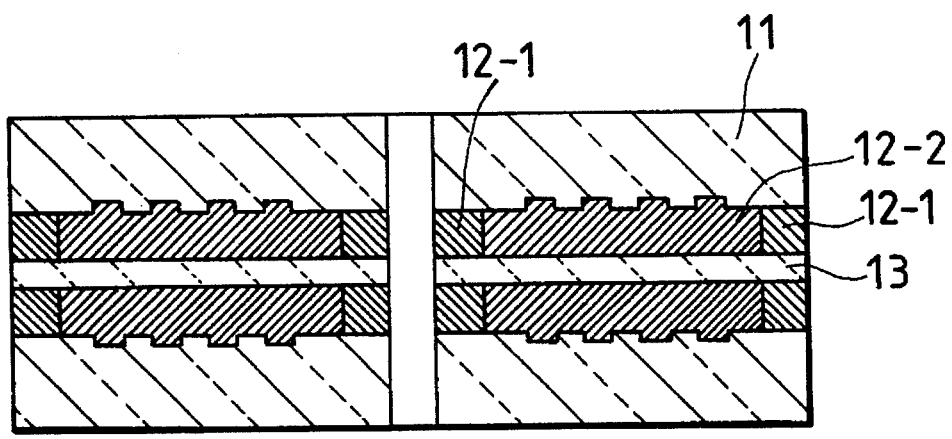
FIG. 8 is a schematic sectional view of an optical disk of another embodiment of the present invention.

A double-sided recording medium can be prepared by combining two optical recording mediums of the present invention with the substrates facing outside and an adhesion layer provided between the recording layers as shown in FIG. 8.

The adhesion layer 13 in the present invention may be made of any material provided that the material affects little the recording layer 12 and is capable of giving sufficient adhesion between the substrate 11 and the protecting layer 14 with interposition of the recording layer 12. The material for the adhesion layer includes synthetic resin type adhesives comprising a resin such as urea resins, melamine resins, phenol resins, epoxy resins, vinyl acetate resins, cyanoacrylate resins, and polyurethane resins; emulsion type adhesives such as vinyl acetate emulsion, ethylene-vinyl acetate emulsion, and acrylate resin emulsion; hot melt type adhesives such as ethylene-vinyl acetate type, elastomer type, polyamide type, polyester type, and polyolefin type; and synthetic rubber type adhesives such as solvent types and latex types.

The protecting layer (a substrate) 14 serves not only to protect the surface of the recording layer 12 against external physical and chemical action but also as a displaying medium for visible information like LOGO as a constitutional part of the optical recording medium. The protecting layer is usually made from plastics, but may be made from metal, glass, ceramics, wood, cloth, or paper.

In the construction of the recording medium of the present invention as shown in FIGS. 1A to 2B, the region 12-1 of the recording layer, namely the portion of the recording layer at the end portion of the substrate and in the vicinity thereof is resinified. The term "vicinity" herein means the width of the region 12-1 which is necessary for protecting effectively the recording-reproduction region 12-2 against external environment. This required width depends on the material of the recording layer and the material of the resinification, and generally in the range of preferably from 1 to 5 mm, more preferably from 2 to 4 mm.

In the embodiment shown in FIGS. 1A to 2B, the recording layer is formed on the substrate including the end portion thereof to have the side end face of the recording layer uncovered, and then the recording layer on the end portion of the substrate and the vicinity thereof is resinified.

Figure 9A:
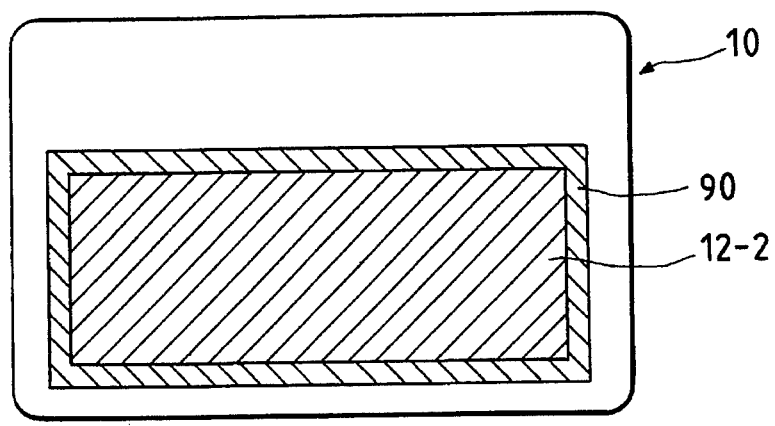
FIG. 9A is a schematic sectional view of another embodiment of an optical card of the present invention.
Figure 9B:
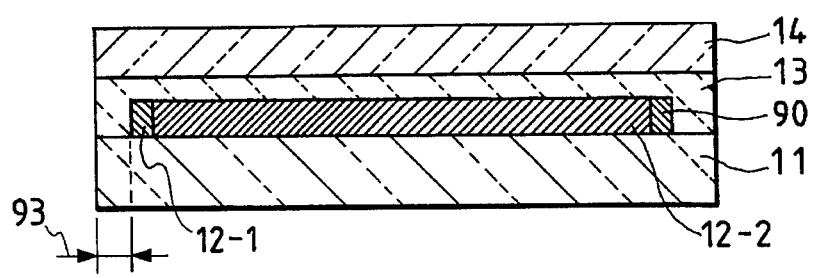
FIG. 9B is a schematic sectional view of the optical card at the line D—D in FIG. 9A.

The present invention, however, is not limited to such constitution. For example, the recording layer may be formed so as not to be bared at the end face of the recording medium, and then the end portion of the recording medium and the vicinity thereof is resinified to seal the recording layer with an adhesion layer, as shown in FIGS. 9A and 9B. In such a construction, the recording layer in the recording-reproduction layer 12-2 is protected doubly by the resinified recording layer 90 and the adhesion layer 13, thereby the recording layer being further stabilized. Consequently, the resulting optical recording medium exhibits high reliability.

In the above case, the width of the region 90 is preferably in the range of from 1 to 3 mm, more preferably from 1 to 2 mm in order to avoid curtailment of the recording region and to keep the protection performance of the recording layer. Further, the breadth of the margin region 93 may be made narrower than the margin region 62 of the conventional recording medium, as shown in FIG. 6, in which the recording layer is sealed by the adhesion layer. Specifically, the width of the margin region is preferably in the range of from 1 to 3 mm, more preferably from 1 to 2 mm, whereby curtailment of the recording region owing to the formation of the margin region can be reduced with retention of the protection of the recording layer.

As described above, the present invention has been accomplished based on the finding of resinification of the recording layer which gives excellent stability and excellent adhesion to the substrate. The present invention provides an optical recording medium having a recording layer having excellent environmental stability, and exhibiting high reliability.

The recording layer, according to the present invention, need not be formed in a pattern form, whereby the optical recording medium is produced at a lower cost.

The region for formation of a recording layer can be made larger according to the present invention, whereby the decrease of the recording capacity is minimized even when the recording layer is formed, for example, by wet application.

The present invention enables production of an optical recording medium having a recording layer having excellent environmental stability, and exhibiting high reliability with high productivity at low cost.

The present invention enables production of a reliable optical recording medium without lowering the recording capacity at a low cost even when the recording layer is formed by a productive wet application method, because the environmental stability of the recording layer is improved without patterning the recording layer.

EXAMPLES

The present invention is described below in more detail by reference to Examples without limiting the invention in any way.

EXAMPLE 1

An optical card was prepared according to the present invention as described below.

Firstly, an acrylic substrate was prepared which has a rectangular shape of 85 mm in length, 54 mm in width, and 0.4 mm in thickness and has track grooves in stripes of 3 µm in width, 12 µm in pitch, and 3000 Å in depth.

On this substrate, on the regions 12-1 and 12-2 shown in FIG. 1A, a recording layer was formed in a width (L) of 36.0 mm in a thickness of 1000 Å by applying a 3% by weight solution of the polymethine pigment of the structural formula below in diacetone alcohol by means of a roll coater, and drying the applied matter:

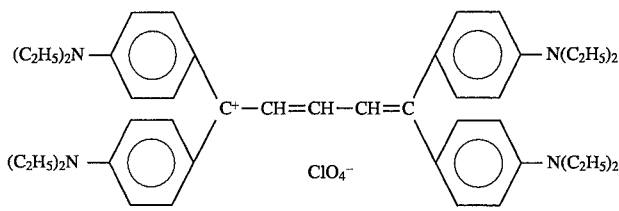

Then the end region 12-1 of the recording layer was resinified as follows. A coating liquid was prepared by dissolving the UV-curable acrylate type resinifying composition below as the impregnating material in a mixed solvent (30% by volume of toluene and 70% by volume of butyl acetate) to adjust the viscosity the liquid to 15 cp.

| | |
|---|---|
| Caprolactone-modified dipentaerythritol hexaacrylate (Trade name: KAYARAD DPCA-30, made by Nippon Kayaku Co. Ltd.) | 75 parts by weight |
| Urethane acrylate (Trade name: ARONIX M-1000, made by Toagosei Chemical Co., Ltd.) | 20 parts by weight |
| Photopolymerization initiator (Trade name: IRG-184, made by Chiba-Geigy (Japan) Ltd.) | 5 parts by weight |

This coating liquid was applied twice on the region 12-1 of the recording layer in a width of 3 mm. Thereby, the acrylate type polymerizable component penetrated into the recording layer, remaining little on the surface.

The region 12-1 of the recording layer was irradiated with UV light (233 mW/cm at the irradiated surface, wavelength: 365 nm) for 10 seconds to cure and resinify the polymerizable component.

On the recording layer 12, an acrylic plate of 0.3 mm thick, 85 mm long, and 54 mm wide was laminated, as a protecting layer with interposition of an ethylene-vinyl acetate hot-melt type film (trade name: HIRODAIN 7500, made by Hirodain Kogyo K.K.). The laminated matter was made to pass between rollers at a surface temperature of 130° C. to fix the protecting layer on the recording layer. Thus an optical card of Example 1 was completed.

Eight optical cards of Example 1 were prepared in total in the same manner.

One of the eight optical cards was set on an optical card recording-reproduction apparatus (made by Canon K.K.), and information was recorded on the recording tracks in the regions 12-1 and 12-2 at a delivery rate of 60 mm/sec in the length direction under the conditions below:

Recording beam diameter: 3 μm

Recording wavelength: 830 nm

Recording power: 4–6 mW

Recording pulse width: 50 μsec

After the recording, the recording area of the optical card was observed by microscopy. It was found that pits were formed by deformation and discoloration of the recording layer at the recorded site of the region 12-2, and neither deformation nor discoloration was caused at the recorded site in the region 12-1 of the recording layer. The recording area was subjected to reproduction treatment under the conditions below:

Wavelength: 830 nm

Diameter of reproduction beam spot: 3.0 μm(1/e$^2$)

Laser output: 0.7 mW

Card delivery rate: 60 mm/sec

As the results, the C/N value was lower than 40 dB at the region 12-1, whereby the region 12-1 was confirmed to be completely resinified and to be made incapable of optical recording.

Figure 11A:
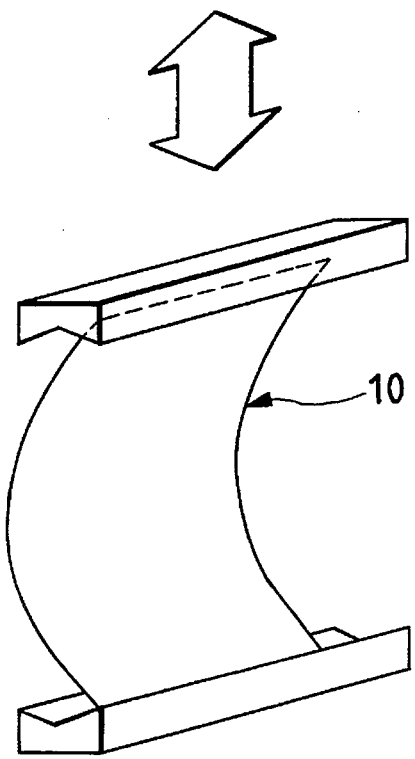
FIG. 11A illustrates schematically the flex test in Examples of the present invention.
Figure 11B:
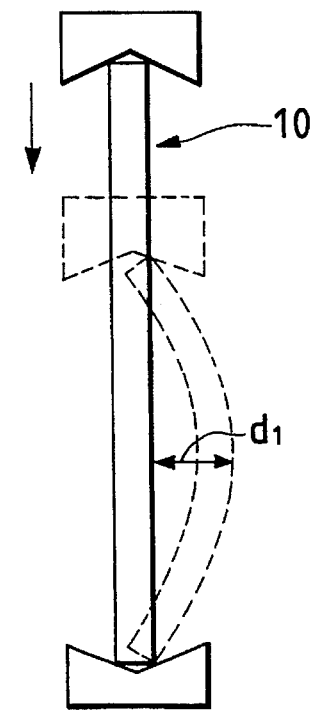
FIG. 11B is a schematic side view of the flex test.

A second optical card of Example 1 was subjected to a flex test as follows. The optical card was held at the short sides as shown in FIG. 11A, and was deflected with retention of the card length to result in deflection $d_1$ of 20 mm at the middle portion as shown in FIG. 11B. The deflection was repeated in forward direction and backward direction each 250 times, 500 times in total. Next, the card was deflected with retention of the card length to result in deflection $d_1$ of 10 mm at the middle portion, and the deflection was repeated in forward direction and backward direction each 250 times, 500 times in total. After the repeated deflection, the protecting layer was tried to delaminate from the substrate by hand, but it could not be delaminated.

Figure 10:
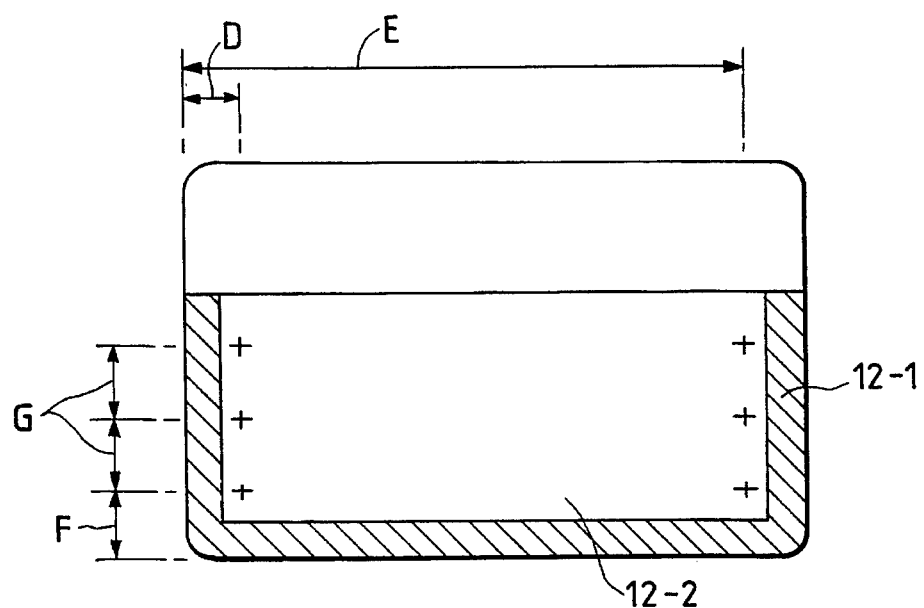
FIG. 10 illustrates points of measurement of reflectivity in Examples of the present invention.

With the other six optical cards of Example 1, reflectivity was measured at six points adjacent to the resinified region 12-1 in the recording-reproduction region 12-2 in the respective cards by means of an optical card recording-reproduction apparatus (made by Canon K.K.). This reflectivity is hereinafter referred to as "initial reflectivity". In FIG. 10, D=6 mm, E=79 mm, F=10 mm, and G=10 mm. The reflectivity was measured by introducing semiconductor laser light having the wavelength of 830 nm through the substrate into the recording layer. The laser light was converged to give a spot diameter of 3 μm at the substrate surface. Consequently, the reflectivity was 15% at all the measured spots.

Subsequently, the six optical cards having been tested for initial reflectivity were subjected to resistance test to six chemicals (1) to (6) according to the standard for chemical resistance test in Method of Testing Credit Card (JBMS-53-1990) laid down by Japan Business Machine Makers Association.

(1) Immersion in aqueous 5 wt. % acetic acid solution at 25° C. for 100 hours, (2) Immersion in acidic artificial sweat at 35° C. for 100 hours (the artificial sweat being prepared based on ISO 105-E, 04-1978), (3) immersion in aqueous 1 wt. % sodium hydroxide solution at 25° C. for 24 hours, (4) Immersion in aqueous 60 wt. % isopropyl alcohol solution at 25° C. for 18 hours, (5) Immersion in gasoline (Fuel B of ISM 1817) for hours, and (6) Standing in a closed chamber of 754 cm$^3$ with 20 g of crystalline p-dichlorobenzene at 25° C. for 100 hours.

The tested cards were taken out after the predetermined time of immersion in or standing with the respective chemicals, and observed visually the change of appearance such as discoloration and decoloration of the recording layer on the recording and/or reproducing region 12-2. Then the reflectivity of the six cards having been tested for the chemical resistance was measured at six points on the respective cards at the same position of the initial reflectivity measurement in the same manner. The ratios of decrease of the reflectivity from the initial reflectivity were derived, and evaluation was made by comparison of the average decrease ratios.

Further, these six optical cards having been tested for the chemical resistance were again subjected to the flex test, and the delamination test.

The results are shown in Table 1.

TABLE 1

|  | Chemical resistance test | Change of recording layer *1 | Change ratio of reflectivity *2 | Bending test *3 After chemical resistance test |
|---|---|---|---|---|
| Example 1 | (1) | A | A | o |
|  | (2) | A | A | o |
|  | (3) | A | A | o |
|  | (4) | A | A | o |
|  | (5) | A | A | o |
|  | (6) | A | A | o |

Evaluation criterion:
*1 A: No change observed visually
B: Change observed visually
*2 Change ratio of reflectivity relative to initial reflectivity
A: Change ratio being not higher than 5%
B: Change ratio being higher than 5% and not higher than 10%
C: Change ratio being higher than 10%
*3 o: Not delaminated
x: Delaminated

COMPARATIVE EXAMPLE 1

Seven optical cards were prepared in the same manner as in Example 1 except that the end region of the recording layer 12-1 was not resinified. The resulting optical cards had the recording layer bared at the side end face of the card as shown in FIG. 4.

These optical cards were evaluated in the same manner as in Example 1. One optical card was subjected to a flex test, and thereafter tested for delamination, but could not be delaminated by hand.

Subsequently, the other six optical cards were subjected to the measurement of initial reflectivity, and then to the chemical resistance test, in the same manner as in Example 1. Thereafter, change of the recording layer was observed. Further, the respective optical cards were again subjected to the measurement of reflectivity and the flex test. The results are shown in Table 2.

COMPARATIVE EXAMPLE 2

Figure 5:
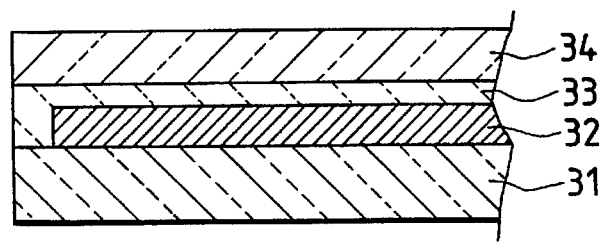
FIG. 5 is an enlarged sectional view of an end face portion of another conventional optical recording medium.
Figure 6:
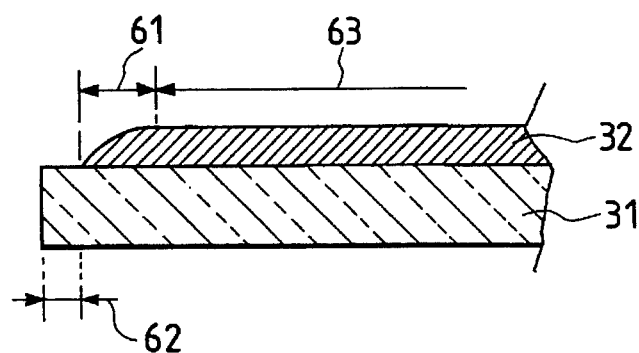
FIG. 6 is a schematic sectional view of a conventional optical recording medium having a recording layer formed by a wet coating method.
Figure 7:
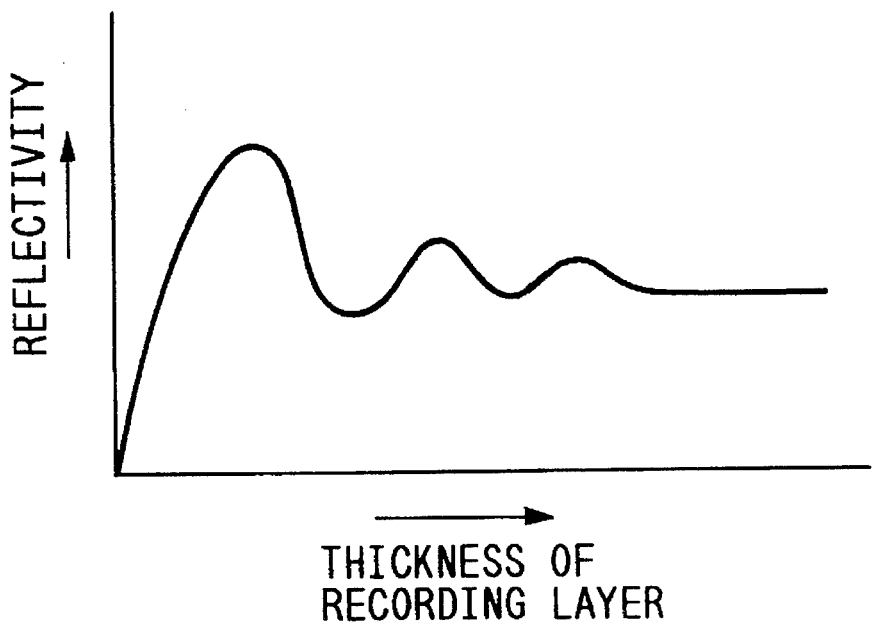
FIG. 7 illustrates roughly relation between the film thickness and the reflectivity of a recording layer containing an organic pigment.

Seven optical cards were prepared in the same manner as in Example 1 except that the recording layer was formed by gravure coating only in the recording-reproduction area 12-2 only to have the construction in which the recording layer was sealed by adhesion layer as shown in FIG. 5 without resinifying the recording layer.

These optical cards were evaluated in the same manner as in Comparative Example 1. One optical card was subjected to a flex test, and thereafter tested for delamination, but could not be delaminated by hand.

Subsequently, the other six optical cards were subjected to the measurement of initial reflectivity, and then to the chemical resistance test, in the same manner as in Example 1. Thereafter, change of the recording layer was observed.

Further the respective optical cards were again subjected to the measurement of reflectivity and the flex test. The results are shown in Table 2.

COMPARATIVE EXAMPLE 3

Eight optical cards were prepared in the same manner as in Example 1 except that the viscosity of the coating liquid of the impregnating material was adjusted to 1500 cp. This impregnating component, when applied on the region 12-1 of the recording layer, did not penetrate sufficiently, and some of the polymerizable component was observed to be remaining on the recording layer.

With the one optical card of Comparative Example 3, information was recorded on the recording tracks in the regions 12-1 and 12-2 in the same manner as in Example 1. After the recording, the recording area of the optical card was observed by microscopy. It was found that pits were formed by deformation and discoloration of the recording layer in the recorded sites of the region 12-2. In the region 12-1 of the recording layer also, pits were observed to be formed, and on reproduction, the C/N value was 42 dB under the reproduction conditions in Example 1, which means that the resinification of the region 12-1 of the recording layer is not sufficient.

Another optical card of this Comparative Example was subjected to the flex test in the same manner as in Example 1. After the flex test, the protecting layer could not be delaminated from the substrate by hand.

The other six optical cards of this Comparative Example 3 was subjected to the measurement of initial reflectivity at six points on the respective cards, and to the chemical resistance test to observe the change of the recording layer in the same manner as in Example 1. Subsequently the optical cards were subjected again to the measurement of reflectivity and the flex test. The results are shown in Table 2.

TABLE 2

|  |  | Chemical resistance test | Change of recording layer | Change ratio of reflectivity | Bending test After chemical resistance test |
|---|---|---|---|---|---|
| Comparative example 1 | (1) | A | A | x |
|  | (2) | A | B | x |
|  | (3) | A | A | x |
|  | (4) | B | C | x |
|  | (5) | B | C | x |
|  | (6) | B | C | x |
| Comparative example 2 | (1) | A | A | o |
|  | (2) | A | A | x |
|  | (3) | A | A | o |
|  | (4) | A | B | x |
|  | (5) | A | B | x |
|  | (6) | A | B | x |
| Comparative example 3 | (1) | A | A | o |
|  | (2) | A | B | o |
|  | (3) | A | A | o |
|  | (4) | A | B | x |
|  | (5) | A | B | x |
|  | (6) | A | B | x |

EXAMPLE 2

Eight optical cards were prepared in the same manner as in Example 1 except that the impregnating material was a UV-curable acrylate type polymerizable component having the composition below and the viscosity was adjusted to 3 cp:

| | |
|---|---|
| Caprolactone-modified dipentaerythritol hexaacrylate (Trade name: KAYARAD DPCA-30, made by Nippon Kayaku Co. Ltd.) | 55 parts by weight |
| Dioxaneglycol diacrylate (Trade name: KAYARAD R-604, made by Nippon Kayaku Co., Ltd.) | 40 parts by weight |
| Photopolymerization initiator (Trade name: IRG-184, made by Chiba-Geigy (Japan) Ltd.) | 5 parts by weight |

Recording was conducted on one recording track extending in the region 12-1 and 12-2 of a first optical card in the same manner as in Example 1. After the recording, the recording area of the optical card was observed by microscopy. It was found that pits were formed by deformation and discoloration of the recording layer at the recorded site in the region 12-2, and neither deformation nor discoloration was caused at the recorded site in the region 12-1 of the recording layer. The recording area was subjected to reproduction treatment in the same manner as in Example 1. As the results, the C/N value was lower than 40 dB at the region 12-1, whereby the region 12-1 was confirmed to be completely resinified and to be made incapable of optical recording.

A second optical card of this Example was subjected to the flex test in the same manner as in Example 1. After the flex test, the optical card could not be delaminated.

The other six optical cards of this Example were subjected to the measurement of initial reflectivity at six points on the respective cards, and thereafter to the chemical resistance test to observe the change of the recording layer in the same manner as in Example 1. Further these six optical cards after the chemical resistance test were again subjected to the measurement of reflectivity and the flex test.

The results are shown in Table 3.

COMPARATIVE EXAMPLE 4

Eight optical cards were prepared in the same manner as in Example 2 except that the viscosity of the coating liquid of the impregnating material was adjusted to 1300 cp. This coating liquid, when applied on the region 12-1 of the recording layer, did not penetrate sufficiently into the recording layer, some of the polymerizable component being observed to be remaining on the recording layer.

With the one optical card of this Comparative Example 4, information was recorded on the recording tracks in the regions 12-1 and 12-2 in the same manner as in Example 1. After the recording, the recorded site of the optical card was observed by microscopy. It was found that pits were formed by deformation and discoloration of the recording layer in the recorded sites of the region 12-2. In the region 12-1 of the recording layer also, pits were observed to be formed, and on reproduction, the C/N value was higher than 40 dB under the reproduction conditions in Example 1, which means that the resinification of the region 12-1 of the recording layer is not sufficient.

Another optical card of this Comparative Example 4 was subjected to the flex test in the same manner as in Example 1. After the flex test, the optical card could not be delaminated by hand.

The other six optical cards of this Comparative Example 4 was subjected to the measurement of initial reflectivity at six points on the respective cards, and to the chemical resistance test to observe the change of the recording layer in the same manner as in Example 1. Subsequently the optical cards were subjected again to the measurement of reflectivity and the flex test. The results are shown in Table 3.

EXAMPLE 3

Eight optical cards were prepared in the same manner as in Example 1 except that the impregnating material was a UV-curable acrylate type polymerizable component having the composition below and the viscosity was adjusted to 10 cp:

| | |
|---|---|
| Caprolactone-modified dipentaerythritol hexaacrylate (Trade name: KAYARAD DPCA-30, made by Nippon Kayaku Co. Ltd.) | 90 parts by weight |
| Bisphenol A diglycidyl ether (Trade name: EPICOAT 828, made by Yuka Shell K.K.) | 5 parts by weight |
| Photopolymerization initiator (Trade name: IRG-184, made by Chiba-Geigy (Japan) Ltd.) | 5 parts by weight |

Recording was conducted on one recording track extending in the region 12-1 and 12-2 of a first optical card in the same manner as in Example 1. After the recording, the recorded site of the optical card was observed by microscopy. It was found that pits were formed by deformation and discoloration of the recording layer at the recorded site in the region 12-2, but neither deformation nor discoloration was caused at the recorded site in the region 12-1 of the recording layer. The recording area was subjected to reproduction treatment in the same manner as in Example 1. As the results, the C/N value was lower than 40 dB at the region 12-1, whereby the region 12-1 was confirmed to be completely resinified and to be made incapable of optical recording.

A second optical card of this Example 3 was subjected to the flex test in the same manner as in Example 1. After the flex test, the optical card could not be delaminated by hand.

The other six optical cards of this Example 3 were subjected to the measurement of initial reflectivity at six points on the respective cards, and thereafter to the chemical resistance test to observe the change of the recording layer in the same manner as in Example 1. Further these six optical cards after the chemical resistance test were again subjected to the measurement of reflectivity and the flex test.

The results are shown in Table 3.

COMPARATIVE EXAMPLE 5

Eight optical cards were prepared in the same manner as in Example 3 except that the viscosity of the coating liquid of the impregnating material was adjusted to 1500 cp. This coating liquid, when applied on the region 12-1 of the recording layer, did not penetrate sufficiently into the recording layer, some of the polymerizable component being observed to be remaining on the recording layer.

With the one optical card of this Comparative Example 5, information was recorded on one sheet of recording tracks in the regions 12-1 and 12-2 in the same manner as in Example 1. After the recording, the recorded site of the optical card was observed by microscopy. It was found that pits were formed by deformation and discoloration of the recording layer in the recorded site of the region 12-2. In the region 12-1 of the recording layer also, pits were observed to be formed, and on reproduction, the C/N value was not less than 40 dB was obtained under the reproduction conditions in Example 1, which means that the resinification of the region 12-1 of the recording layer is not sufficient.

Another optical card of this Comparative Example 5 was subjected to the flex test in the same manner as in Example 1. After the flex test, the optical card could not be delaminated by hand. The other six optical cards of this Comparative Example 5 was subjected to the measurement of initial reflectivity at six points on the respective cards, and to the chemical resistance test to observe the change of the recording layer in the same manner as in Example 1. Subsequently the optical cards were subjected again to the measurement of reflectivity and the flex test. The results are shown in Table 3.

EXAMPLE 4

Eight optical cards were prepared in the same manner as in Example 1 except that the impregnating material was a UV-curable acrylate type polymerizable component having the composition below and the viscosity was adjusted to 15 cp:

| | |
|---|---|
| Neopentylglycol diacrylate (Trade name: KAYARAD NPGDA, made by Nippon Kayaku Co. Ltd.) | 50 parts by weight |
| Dicyclopentenyl acrylate (Trade name: FA-57A, made by Hitachi Chemical Co., Ltd.) | 45 parts by weight |
| Photopolymerization initiator (Trade name: IRG-184, made by Chiba-Geigy (Japan) Ltd.) | 5 parts by weight |

Recording was conducted on one recording track extending in the region 12-1 and 12-2 of a first optical card in the same manner as in Example 1. After the recording, the recorded site of the optical card was observed by microscopy. It was found that pits were formed by deformation and discoloration of the recording layer at the recorded site in the region 12-2, but neither deformation nor discoloration was caused at the recorded site in the region 12-1 of the recording layer. The recording area was subjected to reproduction treatment in the same manner as in Example 1. As the results, the C/N value was lower than 40 dB at the region 12-1, whereby the region 12-1 was confirmed to be completely resinified and to be made incapable of optical recording.

A second optical card of this Example 4 was subjected to the flex test in the same manner as in Example 1. After the flex test, the optical card could not be delaminated by hand.

The other six optical cards of this Example 4 were subjected to the measurement of initial reflectivity at six points on the respective cards, and thereafter to the chemical resistance test to observe the change of the recording layer in the same manner as in Example 1. Further these six optical cards after the chemical resistance test were again subjected to the measurement of reflectivity and the flex test.

The results are shown in Table 3.

COMPARATIVE EXAMPLE 6

Eight optical cards were prepared in the same manner as in Example 4 except that the viscosity of the coating liquid of the impregnating material was adjusted to 1500 cp. This coating liquid, when applied on the region 12-1 of the recording layer, did not penetrate sufficiently into the recording layer, some of the polymerizable component being observed to be remaining on the recording layer.

With the one optical card of this Comparative Example 6, information was recorded on one sheet of recording tracks in the regions 12-1 and 12-2 in the same manner as in Example 1. After the recording, the recorded sites of the optical card was observed by microscopy. It was found that pits were formed by deformation and discoloration of the recording layer in the recorded site of the region 12-2. In the region 12-1 of the recording layer also, pits were observed to be formed, and on reproduction, the C/N value was not less than 40 dB under the reproduction conditions in Example 1, which means that the resinification of the region 12-1 of the recording layer is not sufficient.

Another optical card of this Comparative Example 6 was subjected to the flex test in the same manner as in Example 1. After the flex test, the optical card could not be delaminated by hand.

The other six optical cards of this Comparative Example 6 was subjected to the measurement of initial reflectivity at six points on the respective cards, and to the chemical resistance test to observe the change of the recording layer in the same manner as in Example 1. Subsequently the optical cards were subjected again to the measurement of reflectivity and the flex test. The results are shown in Table 3.

TABLE 3

| | | Chemical resistance test | Change of recording layer | Change ratio of reflectivity | Flex test After chemical resistance test |
|---|---|---|---|---|---|
| Example 2 | (1) | A | A | o |
| | (2) | A | A | o |
| | (3) | A | A | o |
| | (4) | A | A | o |
| | (5) | A | A | o |
| | (6) | A | A | o |
| Comparative example 4 | (1) | A | A | o |
| | (2) | A | B | o |
| | (3) | A | A | o |
| | (4) | A | B | x |
| | (5) | A | B | x |
| | (6) | A | B | x |
| Example 3 | (1) | A | A | o |
| | (2) | A | A | o |
| | (3) | A | A | o |
| | (4) | A | A | o |
| | (5) | A | A | o |
| | (6) | A | A | o |
| Comparative example 5 | (1) | A | A | o |
| | (2) | A | A | x |
| | (3) | A | A | o |
| | (4) | A | B | x |
| | (5) | A | B | x |
| | (6) | A | B | x |
| Example 4 | (1) | A | A | o |
| | (2) | A | A | o |
| | (3) | A | A | o |
| | (4) | A | A | o |
| | (5) | A | B | o |
| | (6) | A | B | o |
| Comparative example 6 | (1) | A | A | o |
| | (2) | A | A | o |
| | (3) | A | A | o |
| | (4) | A | A | o |
| | (5) | A | B | x |
| | (6) | A | B | o |

EXAMPLE 5

Eight optical cards were prepared in the same manner as in Example 1 except that the organic pigment of the recording layer was replaced by the cyanine pigment represented by the chemical structure below:

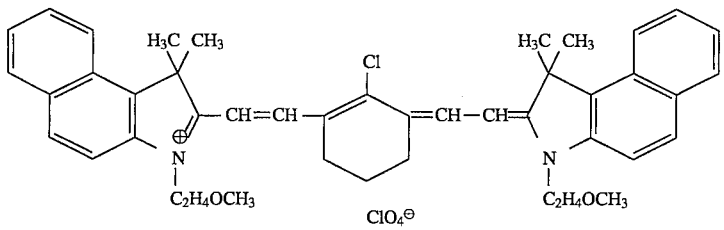

and the impregnating material was a UV-curable acrylate type polymerizable component having the composition below and the viscosity was adjusted to 10 cp:

| | |
|---|---|
| Caprolactone-modified dipentaerythritol hexaacrylate (Trade name: KAYARAD DPCA-30, made by Nippon Kayaku Co., Ltd.) | 75 parts by weight |
| Urethane acrylate (Trade name: ART RESIN UN-9000, made by Negami Kogyo K.K.) | 6 parts by weight |
| MANDA (Trade name KAYARAD-MANDA, made by Nippon Kayaku Co., Ltd.) | 14 parts by weight |
| Photopolymerization initiator (Trade name: IRG-184, made by Chiba-Geigy (Japan) Ltd.) | 5 parts by weight |

Recording was conducted on one recording track extending in the region 12-1 and 12-2 of a first optical card in the same manner as in Example 1. After the recording, the recorded site of the optical card was observed by microscopy. It was found that pits were formed by deformation and discoloration of the recording layer at the recorded site in the region 12-2, but neither deformation nor discoloration was caused at the recorded site in the region 12-1 of the recording layer. The recording area was subjected to reproduction treatment in the same manner as in Example 1. As the results, the C/N value was lower than 40 dB at the region 12-1, whereby the region 12-1 was confirmed to be completely resinified and to be made incapable of optical recording.

A second optical card of this Example 5 was subjected to the flex test in the same manner as in Example 1. After the flex test, the optical card could not be delaminated by hand.

The other six optical cards of this Example 5 were subjected to the measurement of initial reflectivity at six points on the respective cards, and thereafter to the chemical resistance test to observe the change of the recording layer in the same manner as in Example 1. Further these six optical cards after the chemical resistance test were again subjected to the measurement of reflectivity and the flex test.

The results are shown in Table 4.

COMPARATIVE EXAMPLE 7

Eight optical cards were prepared in the same manner as in Example 5 except that the viscosity of the coating liquid of the impregnating material was adjusted to 1200 cp. This coating liquid, when applied on the region 12-1 of the recording layer, did not penetrate sufficiently into the recording layer, some of the polymerizable component being observed to be remaining on the recording layer.

With the one optical card of this Comparative Example 7, information was recorded on one sheet of recording tracks in the regions 12-1 and 12-2 in the same manner as in Example 1. After the recording, the recorded site of the optical card was observed by microscopy. It was found that pits were formed by deformation and discoloration of the recording layer in the recorded site of the region 12-2. In the region 12-1 of the recording layer also, pits were observed to be formed, and on reproduction, the C/N value was not less than 40 dB under the reproduction conditions in Example 1, which means that the resinification of the region 12-1 of the recording layer is not sufficient.

Another optical card of this Comparative Example 7 was subjected to the flex test in the same manner as in Example 1. After the flex test, the optical card could not be delaminated by hand.

The other six optical cards of this Comparative Example 7 were subjected to the measurement of initial reflectivity at six points on the respective cards, and to the chemical resistance test to observe the change of the recording layer in the same manner as in Example 1. Subsequently the optical cards were subjected again to the measurement of reflectivity and the flex test. The results are shown in Table 4.

COMPARATIVE EXAMPLE 8

Eight optical cards were prepared in the same manner as in Example 5 except that the viscosity of the coating liquid of the impregnating material was adjusted to 0.7 cp. This coating liquid, when applied on the region 12-1 of the recording layer, penetrated sufficiently into the recording layer, little polymerizable component being observed to be remaining on the recording layer.

With the one optical card of this Comparative Example 8, information was recorded on one sheet of recording tracks in the regions 12-1 and 12-2 in the same manner as in Example 1. After the recording, the recorded site of the optical card was observed by microscopy. It was found that pits were formed by deformation and discoloration of the recording layer in the recorded site of the region 12-2, but neither deformation nor discoloration was caused at the recorded site in the region 12-1 of the recording layer, which shows that the resinified recording layer of the optical card of Comparative Example 8 is incapable of recording, or the region is completely resinified. However, in the portion of the recording-reproduction region 12-2 adjacent to the region 12-1, the formation of pit was not observed, showing that the resinification spread into this adjacent portion of the recording-reproduction region 12-2 of the recording layer. Accordingly, this optical card was not useful as the optical card.

EXAMPLE 6

Eight optical cards were prepared in the same manner as in Example 5 except that a porous recording layer was formed in a porous state as below.

30 Parts by weight of the cyanine pigment used in Example 5, and 20 parts by weight of azodicarbonamide as a blowing agent were added to 50 parts by weight of 20 wt. % polyvinylbutyral solution in ethanol, and mixed uniformly. The mixture was applied on the surface of the substrate by bar coating in a dry thickness of 2 μm. Then the coated matter was heated for 2 seconds in an oven kept at a controlled temperature of 120°±1° C. to obtain a porous recording layer having porosity of 70%.

Recording was conducted on one recording track extending in the region 12-1 and 12-2 of a first optical card in the same manner as in Example 5. After the recording, the recorded site of the optical card was observed by microscopy. It was found that pits were formed by deformation and discoloration of the recording layer at the recorded site in the region 12-2, but neither deformation nor discoloration was caused at the recorded site in the region 12-1 of the recording layer. The recording area was subjected to reproduction treatment in the same manner as in Example 1. As the results, the C/N value was lower than 40 dB at the region 12-1, whereby the region 12-1 was confirmed to be completely resinified and to be made incapable of optical recording.

A second optical card of this Example 6 was subjected to the flex test in the same manner as in Example 1. After the flex test, the optical card could not be delaminated by hand.

The other six optical cards of this Example 6 were subjected to the measurement of initial reflectivity at six points on the respective cards in the same manner as in Example 1, and thereafter to the chemical resistance test of (1) to (6) below to observe the change of the recording layer. Further these six optical cards after the chemical resistance test were again subjected to the measurement of reflectivity and the flex test.

(1) Immersion in aqueous 5 wt. % acetic acid solution at 25° C. for 200 hours, (2) Immersion in acidic artificial sweat at 35° C. for 200 hours (the artificial sweat being prepared based on ISO 105-E, 04-1978), (3) immersion in aqueous 1 wt. % sodium hydroxide solution at 25° C. for 48 hours, (4) Immersion in aqueous 60 wt. % isopropyl alcohol solution at 25° C. for 36 hours, (5) Immersion in gasoline (Fuel B of ISO 1817) for 96 hours, and (6) Standing in a closed chamber of 754 cm³ with 20 g of crystalline p-dichlorobenzene at 25° C. for 200 hours.

The results are shown in Table 4.

TABLE 4

|  |  | Chemical resistance test | Change of recording layer | Change ratio of reflectivity | Flex test After chemical resistance test |
|---|---|---|---|---|---|
| Example 5 |  | (1) | A | A | o |
|  |  | (2) | A | A | o |
|  |  | (3) | A | A | o |
|  |  | (4) | A | A | o |
|  |  | (5) | A | A | o |
|  |  | (6) | A | A | o |
| Comparative example 7 |  | (1) | A | A | o |
|  |  | (2) | A | B | x |
|  |  | (3) | A | A | o |
|  |  | (4) | B | C | x |
|  |  | (5) | B | C | x |

TABLE 4-continued

|  |  | Chemical resistance test | Change of recording layer | Change ratio of reflectivity | Flex test After chemical resistance test |
|---|---|---|---|---|---|
|  |  | (6) | B | C | x |
| Example 6 |  | (1) | A | A | o |
|  |  | (2) | A | A | o |
|  |  | (3) | A | A | o |
|  |  | (4) | A | A | o |
|  |  | (5) | A | A | o |
|  |  | (6) | A | A | o |

What is claimed is:

1. An optical recording medium having a substrate, a recording layer having a bare portion at an end face thereof, and a protecting layer, the bare portion of the recording layer and the vicinity thereof being resinified so as to be substantially incapable of optical recording.

2. An optical recording medium according to claim 1, wherein the recording layer is resinified by impregnating an uncured liquid polymerizable component into the recording layer, and curing the impregnated component.

3. An optical recording medium according to claim 2, wherein the liquid polymerizable component is a photocurable component.

4. An optical recording medium according to claim 2, wherein the liquid polymerizable component has a viscosity of from 1 to 1000 cp.

5. An optical recording medium according to claim 4, wherein the liquid polymerizable component has a viscosity of from 1 to 300 cp.

6. An optical recording medium according to claim 1, wherein the recording layer is resinified by curing photocurable component containing an acrylate compound.

7. An optical recording medium according to claim 6, wherein the acrylate compound has three or more functional groups.

8. An optical recording medium according to claim 1, wherein the recording layer contains an organic pigment.

9. An optical recording medium according to claim 8, wherein the recording layer is a wet-coated film of the organic pigment.

10. An optical recording medium according to claim 8, wherein the organic pigment is a polymethine pigment.

11. An optical recording medium according to claim 10, wherein the polymethine pigment has the structure represented by the structural formula below:

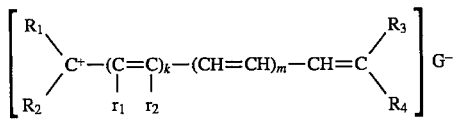

wherein $R_1$, $R_2$, $R_3$, and $R_4$ are independently a hydrogen atom, a substituted or unsubstituted alkyl group, a substituted or unsubstituted alkenyl group, a substituted or unsubstituted aralkyl group, a substituted or unsubstituted aryl group, a substituted or unsubstituted styryl group, or substituted or unsubstituted heterocyclic group; $r_1$ and $r_2$ are independently a hydrogen atom, a substituted or unsubstituted alkyl group, a substituted or unsubstituted cycloalkyl group, a substituted or unsubstituted alkenyl group, a substituted or unsubstituted aralkyl group, or a substituted or unsubstituted aryl group; k is 0 or 1, m is 0, 1, or 2; and $G^-$ is an anion.

12. An optical recording medium according to claim 1, wherein the recording layer in the region not resinified is of a porous structure.

13. An optical recording medium according to claim 10, wherein the porous structure has a porosity of from 30 to 80%.

14. An optical recording medium having a substrate, a recording layer, and a protecting layer, an end portion and the vicinity thereof of the recording layer being resinified so as to be substantially incapable of optical recording.

15. An optical recording medium according to claim 14, wherein the recording layer is resinified by impregnating an uncured liquid polymerizable component into the recording layer, and curing the impregnated component.

16. An optical recording medium according to claim 15, wherein the liquid polymerizable component is a photocurable component.

17. An optical recording medium according to claim 15, wherein the liquid polymerizable component has a viscosity of from 1 to 1000 cp.

18. An optical recording medium according to claim 17, wherein the liquid polymerizable component has a viscosity of from 1 to 300 cp.

19. An optical recording medium according to claim 14, wherein the recording layer is resinified by curing photocurable component containing an acrylate compound.

20. An optical recording medium according to claim 19, wherein the acrylate compound has three or more functional groups.

21. An optical recording medium according to claim 14, wherein the recording layer contains an organic pigment.

22. An optical recording medium according to claim 21, wherein the organic pigment is a polymethine pigment.

23. An optical recording medium according to claim 25, wherein the polymethine pigment has the structure represented by the structural formula below:

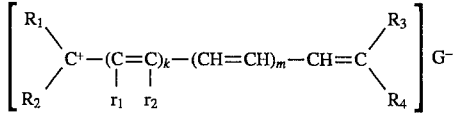

wherein $R_1$, $R_2$, $R_3$, and $R_4$ are independently a hydrogen atom, a substituted or unsubstituted alkyl group, a substituted or unsubstituted alkenyl group, a substituted or unsubstituted aralkyl group, a substituted or unsubstituted aryl group, a substituted or unsubstituted styryl group, or substituted or unsubstituted heterocyclic group; $r_1$ and $r_2$ are independently a hydrogen atom, a substituted or unsubstituted alkyl group, a substituted or unsubstituted cycloalkyl group, a substituted or unsubstituted alkenyl group, a substituted or unsubstituted aralkyl group, or a substituted or unsubstituted aryl group; k is 0 or 1, m is 0, 1, or 2; and $G^-$ is an anion.

24. An optical recording medium according to claim 14, wherein the recording layer is a wet-coated film of the organic pigment.

25. An optical recording medium according to claim 14, wherein the recording layer in the region not resinified is of a porous structure.

26. An optical recording medium according to claim 23, wherein the porous structure has a porosity of from 30 to 80%.

27. An optical recording medium having a substrate, a recording layer containing an organic pigment, and a protecting layer, an end portion and the vicinity thereof of the recording layer being resinified so as to be substantially incapable of optical recording.

28. An optical recording medium according to claim 27, wherein the recording layer is resinified by impregnating an uncured liquid polymerizable component into the recording layer, and curing the impregnated component.

29. An optical recording medium according to claim 28, wherein the liquid polymerizable component is a photocurable component.

30. An optical recording medium according to claim 28, wherein the liquid polymerizable component has a viscosity of from 1 to 1000 cp.

31. An optical recording medium according to claim 30, wherein the liquid polymerizable component has a viscosity of from 1 to 300 cp.

32. An optical recording medium according to claim 27, wherein the recording layer is resinified by curing photocurable component containing an acrylate compound.

33. An optical recording medium according to claim 32, wherein the acrylate compound has three or more functional groups.

34. An optical recording medium according to claim 27, wherein the recording layer is a wet-coated film of the organic pigment.

35. An optical recording medium according to claim 27, wherein the recording layer in the region not resinified is of a porous structure.

36. An optical recording medium according to claim 35, wherein the porous structure has a porosity of from 30 to 80%.

37. An optical recording medium according to claim 27, wherein the organic pigment is a polymethine pigment.

38. An optical recording medium according to claim 37, wherein the polymethine pigment has the structure represented by the structural formula below:

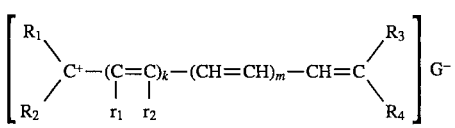

wherein $R_1$, $R_2$, $R_3$, and $R_4$ are independently a hydrogen atom, a substituted or unsubstituted alkyl group, a substituted or unsubstituted alkenyl group, a substituted or unsubstituted aralkyl group, a substituted or unsubstituted aryl group, a substituted or unsubstituted styryl group, or substituted or unsubstituted heterocyclic group; $r_1$ and $r_2$ are independently a hydrogen atom, a substituted or unsubstituted alkyl group, a substituted or unsubstituted cycloalkyl group, a substituted or unsubstituted alkenyl group, a substituted or unsubstituted aralkyl group, or a substituted or unsubstituted aryl group; k is 0 or 1, m is 0, 1, or 2; and $G^-$ is an anion.

* * * * *

UNITED STATES PATENT AND TRADEMARK OFFICE
CERTIFICATE OF CORRECTION

PATENT NO. : 5,503,889
DATED : April 2, 1996
INVENTOR(S) : HIROYUKI IMATAKI

It is certified that error appears in the above-indentified patent and that said Letters Patent is hereby corrected as shown below:

COLUMN 1

Line 54, "severe" should read --more severe--.
Line 62, "affect" should read --effect--.

COLUMN 6

Line 5, "compound" should read --compounds--.

COLUMN 7

Between Lines 60 and 61, below "$r_1$" in formula II, insert --$G^-$--.

COLUMN 9

Line 3, "Therefor," should read --Therefore,--.

COLUMN 11

Line 25, "Chiba-Geigy" should read --Ciba-Geigy--.

COLUMN 12

Line 58, "for hours," should read --for 48 hours,--.

UNITED STATES PATENT AND TRADEMARK OFFICE
CERTIFICATE OF CORRECTION

PATENT NO. : 5,503,889
DATED : April 2, 1996
INVENTOR(S) : HIROYUKI IMATAKI

It is certified that error appears in the above-indentified patent and that said Letters Patent is hereby corrected as shown below:

COLUMN 14

Line 32, "was" should read --were--.

COLUMN 15

Line 11, "Chiba-Geigy" should read --Ciba-Geigy--.
Line 66, "was" should read --were--.

COLUMN 16

Line 21, "Chiba-Geigy" should read --Ciba-Geigy--.

COLUMN 17

Line 8, "was" should read --were--.
Line 32, "Chiba-Geigy" should read --Ciba-Geigy--.

COLUMN 18

Line 19, "was" should read --were--.

COLUMN 19

Line 27, "Chiba-Geigy" should read --Ciba-Geigy--.

UNITED STATES PATENT AND TRADEMARK OFFICE
CERTIFICATE OF CORRECTION

PATENT NO. : 5,503,889
DATED : April 2, 1996
INVENTOR(S) : HIROYUKI IMATAKI

It is certified that error appears in the above-indentified patent and that said Letters Patent is hereby corrected as shown below:

COLUMN 21

Line 8, "porus" should read --porous--.

COLUMN 23

Line 4, "claim 10," should read --claim 12,--.
Line 59, "claim 23," should read --claim 25,--.

Signed and Sealed this

Thirteenth Day of August, 1996

Attest:

BRUCE LEHMAN

Attesting Officer     Commissioner of Patents and Trademarks